United States Patent Office

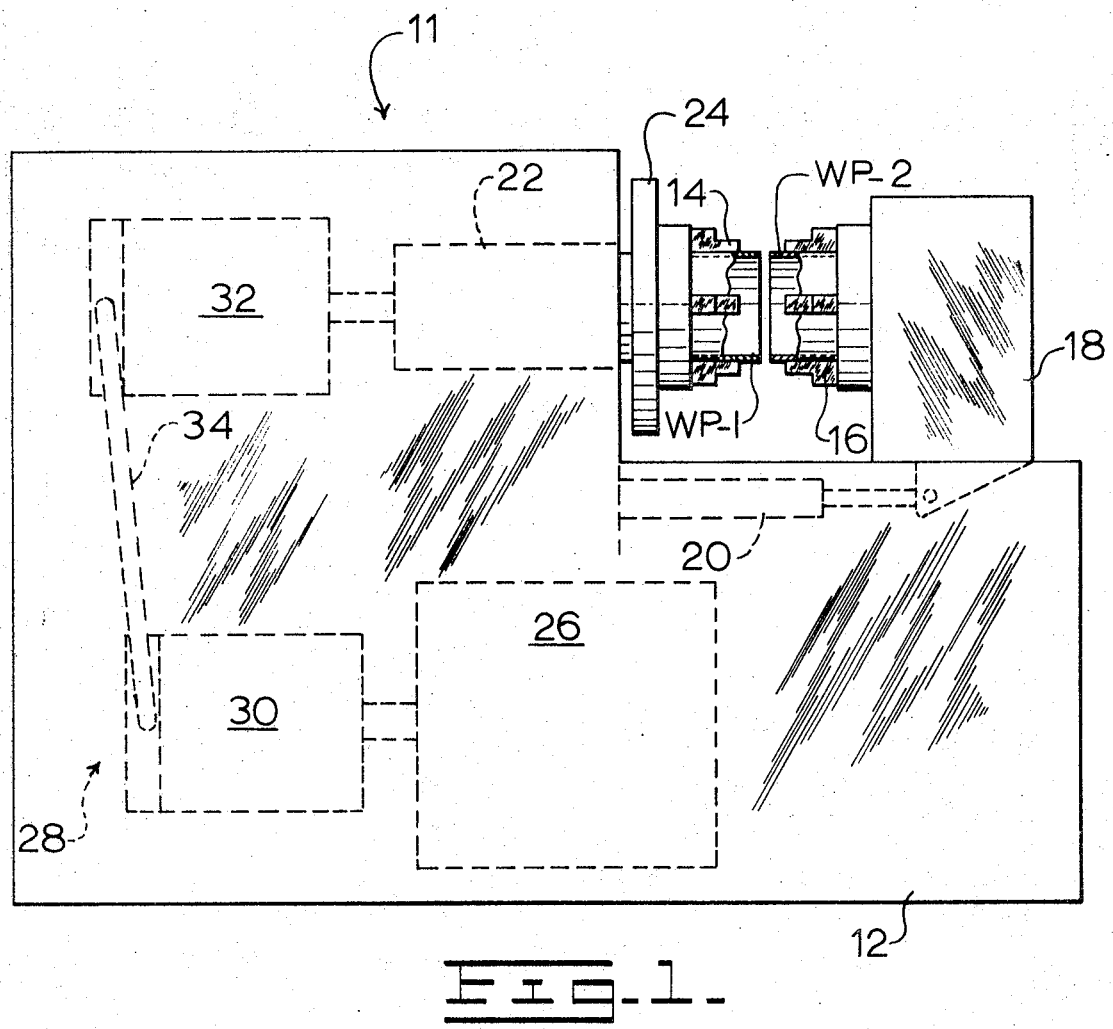

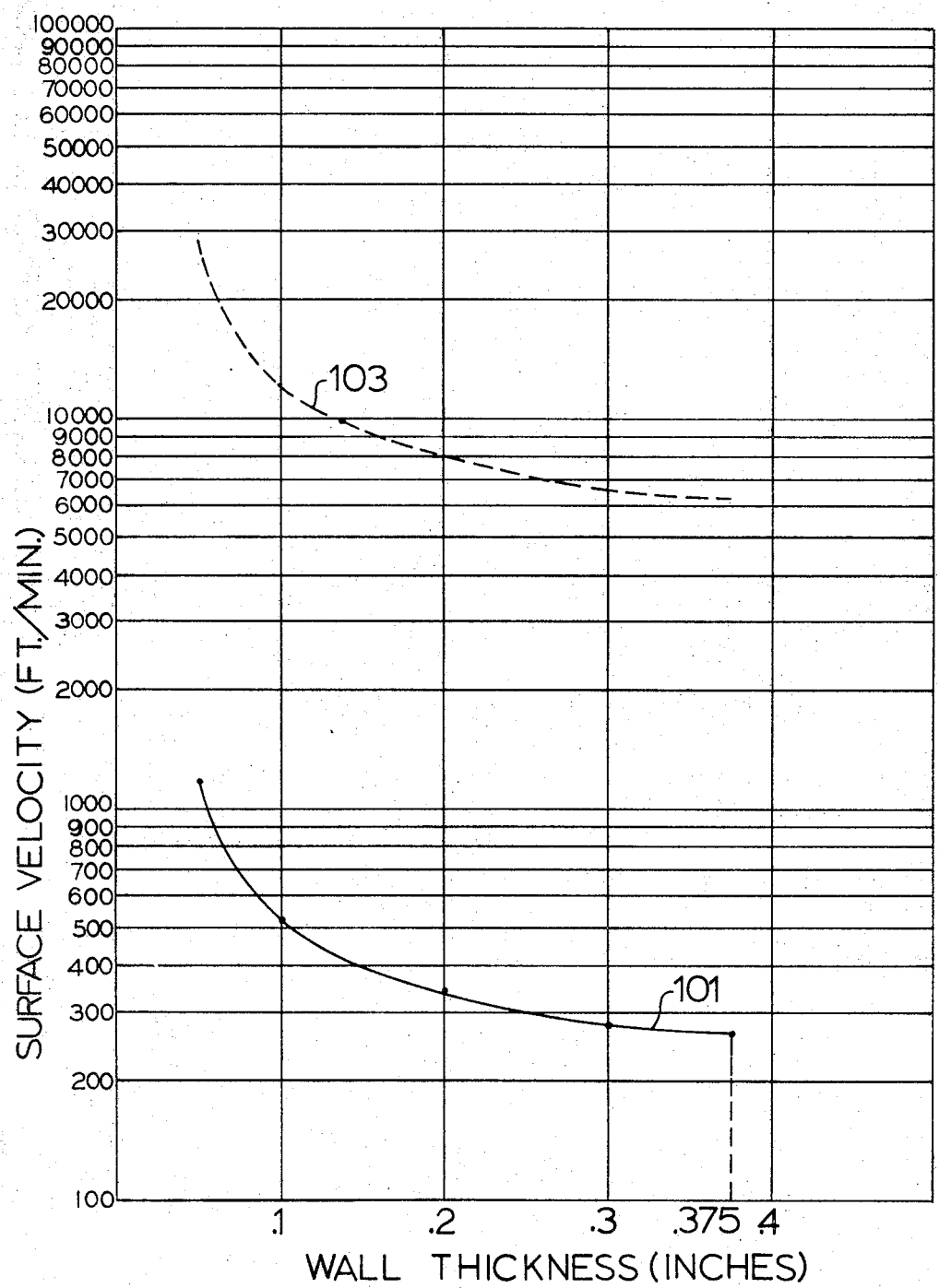

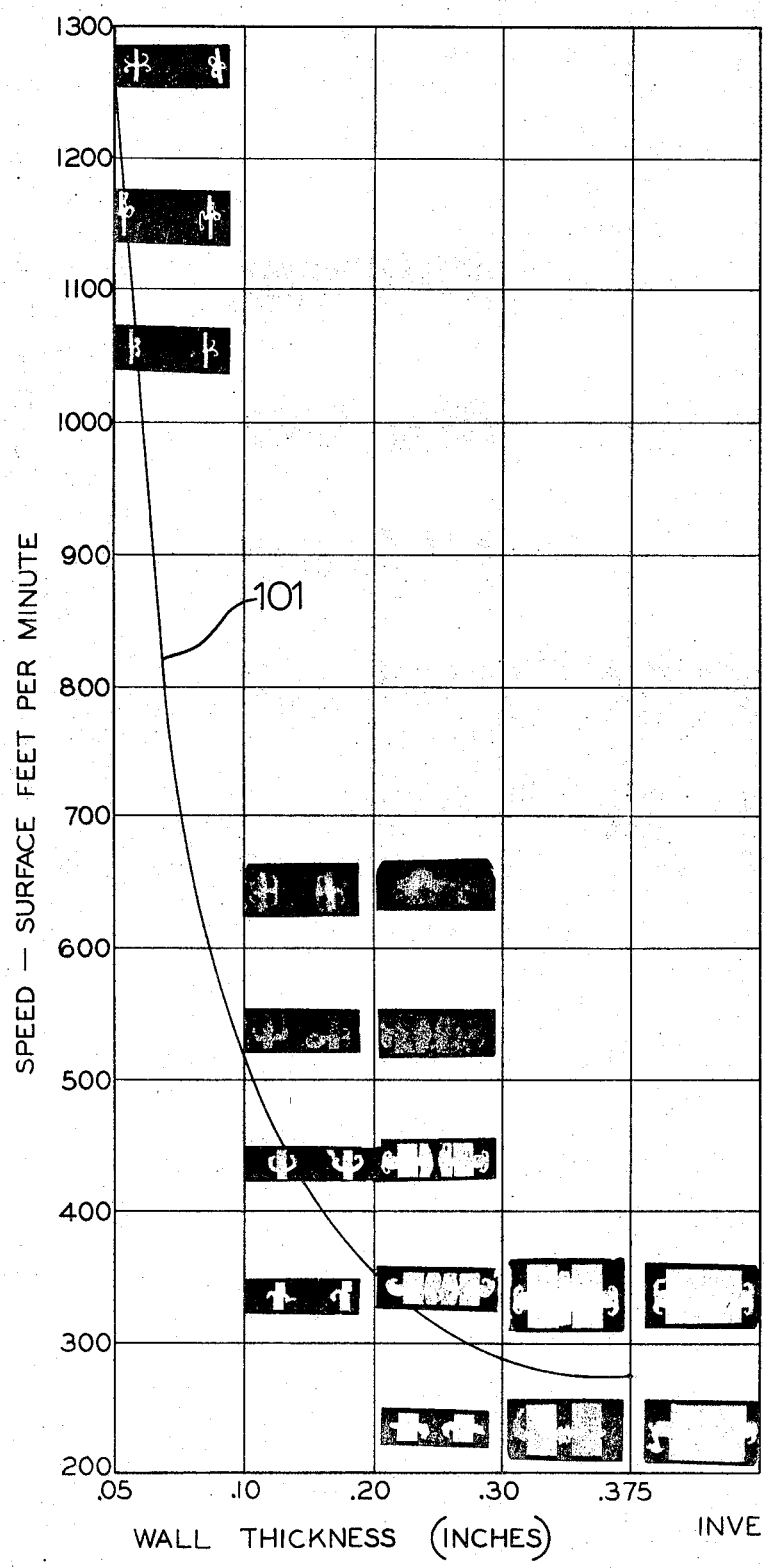
Fig-3-

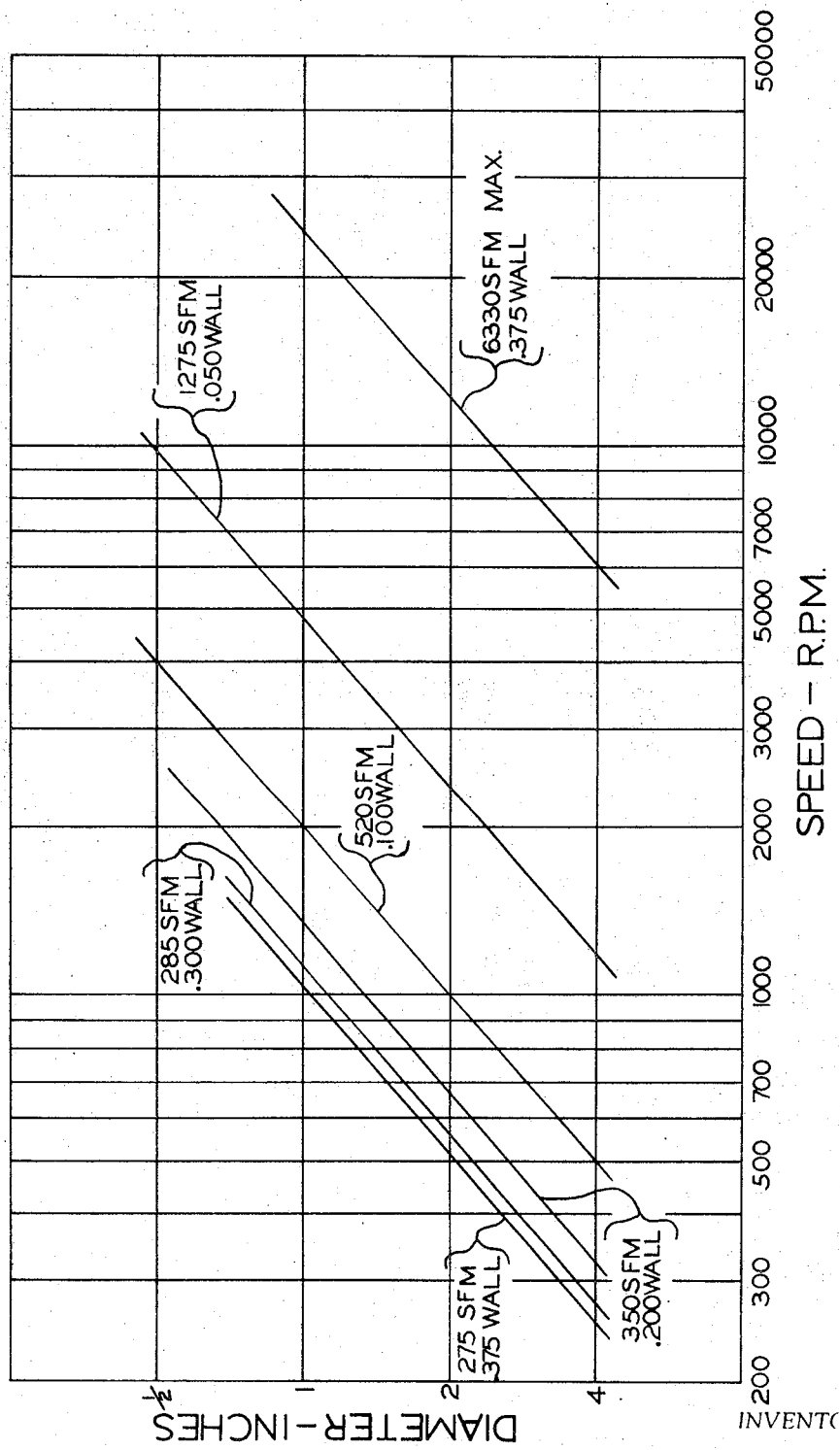

3,568,299
Patented Mar. 9, 1971

3,568,299
WELDING THIN WALL TUBES
Marion R. Calton, East Peoria, and James A. Willerton, Jr., Peoria, Ill., assignors to Caterpillar Tractor Co., Peoria, Ill.
Filed June 11, 1968, Ser. No. 736,039
Int. Cl. B23k 27/00
U.S. Cl. 29—470.3
9 Claims

ABSTRACT OF THE DISCLOSURE

Welding thin wall tubes of steel together or to other structures by friction welding at high speed including methods for determination of such speeds.

BACKGROUND OF THE INVENTION

This invention relates to improvements in friction welding of the general type wherein two workpieces are subjected to relative rotation while in rubbing contact with each other under pressure and the contact surfaces are heated to a bonding temperature by friction and plastic working produced by relative motion at the contacting surfaces.

More particularly, the invention relates to friction welding of thin wall tubes to other tubes or configurations.

For the purposes of this disclosure, the term friction welding shall include both conventional friction welding and inertia welding as described in U.S. Patent No. 3,273,233. As set forth therein, conventional friction welding is a sequential process in which the parts to be joined are first engaged under pressure at a common interface and rotated relative to one another to bring the interface to a certain temperature level and to certain conditions of sliding friction at the interface. The rotation is then stopped as quickly as possible to keep the rotating masses from breaking the bond after it is partly formed. In many cases an increased axial force is then applied to produce an upset pressure effective to squeeze out a substantial amount of flash at the interface area and to form a bond as the parts cool.

Inertia welding takes place when two or more parts to be joined are moved relative to one another and are then pressed together at an interface; the pressure of engagement is very rapidly built up to convert mechanical energy to heat at the interface. The pressure build-up and application of the energy is so quick that the heat is concentrated on each side of the interface until the bond is formed. No auxiliary braking, sensing, limiting or compensating equipment or controls are required. Instead, a predetermined limited amount of energy is quickly imparted to the parts; and the resistance to plastic working, developed at and adjacent to the interface as the bond forms, stops relative movement of the parts as soon as the input of energy ends. As described in U.S. Pat. No. 3,273,233, inertia welding utilizes a varying speed and a short weld time, thereby producing a narrow heat affected zone.

Conventional friction welding is usually performed at a constant speed over a relatively long weld time and produces a large heat affected zone. This causes buckling, twisting and deformation of thin wall tubes.

If the conventional welding process is varied so as to utilize a high initial speed and short weld time, only a small heat affected zone will be produced and the deformation of the tubes will be obviated.

Thus, bonding of tubes may be done with either conventional friction welding or inertia friction welding if the proper parameters are utilized and the term friction welding as used in this disclosure shall include both of these processes.

For the purposes of further definition, it should be understood that in this disclosure, the term "thin wall tubing" means a tube having an outer radial and inner radial differential of not more than 0.375 inch regardless of the dimension of either of the diameters of the tube. Experimentation has supported theory in showing that with greater wall thicknesses the previous findings relative to solid pieces and tubes prevail. That is, the parameters normally used for solid pieces and thick wall tubes are preferred (over those parameters described in this application) if the wall thickness of the tube is greater than ⅜" (0.375 inch).

It has been generally accepted and shown that the optimum velocity range for the inertia welding of solid steel bars is approximately 350 to 1,000 surface feet per minute and the range for welding tubing has been considered to be 800 to 2,000 surface feet per minute. These ranges can require the use of low spindle speeds and large flywheel masses, depending on the size of the parts being welded. As the flywheels increase in size, the size of the machine must be increased and greater rigidity must usually be provided. In turn, this can cause the machine to be more costly, and the larger flywheels can require more time and effort for machine set up. Additionally, low spindle speeds tend to increase the torque produced during welding and holding the weld pieces can become a problem.

It is therefore an object of this invention to provide a method of friction welding thin wall tubing on machines heretofore believed to be incapable of performing such a weld.

It is also an object of this invention to provide such a method wherein it is possible to determine the required initial speed of a thin wall tube workpiece when the wall thickness of the tube is known.

Another object of this invention is to provide such a method wherein a machine used in the performance thereof may be manufactured with less rigid construction than previously possible.

A further object of this invention is to disclose a range of parameter variation suitable for performance of a method of friction welding of thin wall tubes.

A still further object of this invention is to provide a method of friction welding a tubular member to a second tubular member of like or unlike diameter and wall thickness or to a plate member using a peripheral velocity in excess of speeds heretofore believed suitable.

Another object of this invention is to provide a method of friction welding thin wall tubing.

Other objects and advantages of the present invention will be apparent from the following description and claims as illustrated in the accompanying drawings which, by way of illustration, show a preferred embodiment of the present invention and principles thereof and what is now considered to be the best mode contemplated for applying these principles. It is recognized that other embodiments of the invention utilizing the same or equivalent principles may be used and structural changes may be made as desired by those skilled in the art without departing from the present invention and the purview of the appended claims.

BRIEF DESCRIPTION OF THE DRAWINGS

FIG. 1 is a side elevation, partly in section, illustrating one embodiment of a friction welding machine which may be used to practice the method of the present invention;

FIG. 2 is a logarithmic graphical display of wall thickness versus surface velocity upon which is plotted a first curve showing critical speed and a second curve showing maximum practical speed;

FIG. 3 is a linear graphical display of the critical speed curve of FIG. 2 showing sectioned weld specimens formed by welding tubes at points along or near the critical speed curve;

FIG. 4 is a graphical display of speed in revolutions per minute versus tubing outer diameter in inches, with curves thereon depicting how critical speed varies with a change in wall thickness.

DESCRIPTION OF THE PREFERRED EMBODIMENT

A friction welding machine constructed in accordance with one exemplary embodiment of the present invention is indicated generally by the reference numeral 11 in FIG. 1. As shown, the machine comprises a frame or housing structure generally denoted at 12 for housing the various elements of the machine. The two tubes to be welded, workpieces WP-1 and WP-2, are mounted within chucks 14 and 16.

The chuck 16 does not rotate and is mounted on a tailstock fixture 18. The fixture 18 is mounted for axial movement on the machine frame 12 under the control of a load cylinder 20. A pressure control circuit (not shown) regulates the pressure in the load cylinder, and thus determines the force with which the tubes WP-1 and WP-2 are engaged.

The chuck 14 is mounted on a spindle 22, and the chuck and spindle are mounted for rotation within the frame 12. The rotary spindle 22 is adapted to receive flywheels 24 which may be of various size and mass depending upon the particular application of the machine.

An electric motor 26 rotates the spindle through a hydrostatic transmission indicated generally by the reference numeral 28. The hydrostatic transmission includes hydrostatic pump 30, a hydrostatic motor 32, and a manifold 34 between the pump and motor.

The drive ratio between the motor and the spindle 22 can be varied by changing the cam angles in either the pump 30 or the motor 32, and the pump and motor can be used to effectively disconnect the motor 26 from the spindle 22 by moving the cam and the pump 30 to a position in which the pump 30 does not displace any hydraulic fluid to the motor 32.

It is to be understood that the flywheel weights 24 are mounted on the spindle 22 so that the welding machine 11 can be operated as an inertia welding machine as described in U.S. Pat. No. 3,273,233 and as described in further detail below.

A welding operation to join a first workpiece such as a high heat conducting material to a second workpiece such as another high heat conducting material or other metal such as steel, for example, can be performed by operating the machine in the following general manner. One of the weld pieces WP-1 is firmly clamped in the rotatable chuck 14 located on the spindle 22. The other weld piece WP-2 is firmly clamped in the nonrotatable chuck 16 which is located on the tailstock portion 18 of the machine. Upon actuation of the motor 26, the flywheel and workpiece WP-1 are accelerated to a predetermined velocity.

Once the predetermined velocity has been obtained, the motor 26 is disconnected or shut down and the ram mechanism 20 is actuated to move tailstock portion 18 and tube WP-2 into contact with the rapidly rotating tube WP-1. As the two workpieces are brought into contact under the upsetting pressure applied through ram 20, heat is generated at the contacting surface or interface of the weld pieces. This heating increases until the workpieces reach the weld temperature, at which time the upsetting pressure, applied by the ram 20 at either a constant or varying pressure, causes flashing or upsetting to occur. During this heating and flashing the rotational velocity of the spindle member 22 has continued to decrease. At the time the rotation of the spindle ceases, upsetting has taken place and the weld is completed.

In determining the feasibility of welding thick and thin wall tubes at the same surface velocity, experimental evidence has indicated that the lower critical surface velocity in tube welding is a function of the wall thickness rather than independent of it.

In friction welding, localized seizure and breaking of seizure areas occur in the first stage after disruption of protective oxides of the surface has taken place. The torque continues to rise until the end of the first stage as a result of increasing area of such surface contact seizure. At the beginning of the second stage, the interface develops a stabilized plastic condition and the pressure and temperature for bonding are believed to be present while the speed of rotation is above the speed at which the bond can form. There is a distinct interface during this second stage, whatever flash is produced is unjoined flash, and this stage acts as a safety valve to dissipate energy in excess of that required to bring the interface to a bondable temperature. The power absorbed by the interface balances that put into the parts until the speed is decreased to a speed at which the parts can bond under the forces applied. Thus, for the purposes of this disclosure, the lower critical initial surface velocity necessary to insure a commercially suitable interface weld in thin wall tubing is that surface velocity below which no second stage flash is observed. A rather thorough description of these stages is found in the above cited patent.

If the critical surface velocity were not a function of wall thickness, all tubes welded at the same initial surface velocity would have flash of similar appearance. Experimentation has shown that this is not the case. The experimental procedure in determining the relationship between initial surface velocity and wall thickness was based upon the assumption that the energy input to a weld is a linear function of time, which is generally true for an inertia weld cycle. An inertia type weld with a predetermined initial surface velocity was made upon a tube of measured wall thickness such that second stage flash occurred. The weld time required to make this weld was given the value of unity. In other words, for the given initial case the energy required to produce the suitable weld and the time required to make the weld were both given the value of unity. The weld times required to make equivalent welds, i.e., produce similar flash, in tubes of different wall thicknesses or at different initial surface velocities were then found to be some factor times unity.

In FIG. 2, the curve shown as 101 illustrates a plot of points showing the relationship of wall thickness and initial critical surface velocity in feet per minute. This curve shows that a more accurate method of determining the initial critical surface velocity may now be used through the utilization of a formula which correlates wall thickness to the initial surface velocity. This formula is:

$$S.V. = 260 + \frac{K^2}{(W.T.)^2}$$

Where:
S.V. = Surface velocity
W.T. = Wall thickness
K = Welding velocity coefficient For purposes of definition, welding velocity coefficient K is an empirically determined constant which depends on the material used. Dimensionally speaking, the units of K are length to the three halves power divided by time squared in order to be consistent with surface velocity (S.V.) which is in units of length over time and wall thickness (W.T.) which is in units of length. Thus, if S.V. is in units of feet/min. and W.T is in units of feet, K is in units of ft. 3/2/min.1/2.

Comparison of the equation with the result plotted on the experimental curve has shown that the value of K will vary according to the material being used and, within reasonably small limits, may vary slightly within certain ranges for the same material. For example, it has been found that when welding tubes of 1018 steel of .75 inch O.D., when the wall thickness is less than 0.11 inch, $K=1.6$ for the most accurate results, and for wall thicknesses from 0.11 to 0.375 inch, $K=1.7$.

While thus far we have been discussing the minimum initial critical surface velocity for any given wall thickness of a thin wall tube, it should, of course, be obvious that greater initial velocity may be utilized to provide satisfactory welds. For all practical purposes, a thin wall tube can be satisfactorily welded so long as the initial surface velocity meets or exceeds the value shown by curve 101 or determined by the above formula.

On the other hand, physical aspects of materials will dictate that a maximum practical velocity may be reached when the materials being welded reach such a high state of plasticity that an undesirable pyrotechnic effect is produced. Experimentation and theory indicate that the curve shown as 103 in FIG. 2 is a plot of the maximum practical surface velocity for 1018 steel thin wall tube welding.

Referring now to FIG 3, there is shown a graphical illustration of curve 101 on a linear scale. Superimposed upon the graph are photographs of sectioned weld specimens of actual welds made in the investigation of the subject matter leading to this invention. The vertical line directly to the left of each weld specimen represents the wall thickness of the specimen and the horizontal line directly below each specimen represents the approximate initial surface velocity. Since the curve represents the minimum or lower critical surface velocity for the given wall thickness, those specimens welded at a velocity above or to the right of the curve show acceptable welds while those at a velocity below or to the left of the curve are unacceptable. For example, it is readily seen through reference to the welds performed on tubes having a wall thickness of 0.10 inch that as the initial velocity was raised from approximately 300 surface feet per minute to approximately 600 surface feet per minute, the flash produced indicates that the quality of the weld was similarly elevated.

Another depiction of how minimum or critical velocity varies with the change in wall thickness is shown on the chart of FIG. 4 in which a graphical display of speed in revolutions per minute versus diameter in inches is plotted for each of the five thicknesses plotted on curve 101 in FIG. 2. Note that on the graph of FIG. 4, there is plotted on the left hand portion thereof a line for a tube having a weld thickness of .375 inch and an initial velocity of 275 surface feet per minute. Utilizing this graph we find that when the outer diameter of such a tube is 4 inches, the initial speed for critical surface velocity will be approximately 260 revolutions per minute. If the diameter of such a tube is 1.00 inch, then the initial speed must be approximately 1,100 revolutions per minute to produce a satisfactory weld. The line plotted to the far right in the graph is a speed line of 6,330 surface feet per minute for a tube having a wall thickness of .375 inch and is the maximum practical speed for such a tube as shown in the graph of FIG. 2 on curve 103. A comparison of the graph of FIG. 4 with that of FIG. 44 of U.S. Pat. No. 3,273,233 will readily indicate that the surface velocity ranges for thin wall tubing are quite different than previously anticipated. Thus, a far wider range of speed for welding thin wall tubing has been found that has been previously thought possible and a formula has been disclosed for determining the lower limits of the range.

Having described preferred embodiments of this method, it must be understood that we do not intend to be limited to the precise details shown, but rather to the full range of coverage delineated by the following claims.

What we claim is:

1. A method of welding pieces of thin wall tubing together comprising the steps of effecting relative rotation of the tubes, forcing the tubes into frictional engagement at their common interface until a bond is formed and the relative rotation of the workpieces is stopped wherein said step of effecting relative rotation is accomplished at or above a minimum initial relative speed determined by the formula:

$$S.V. = 260 + \frac{K^2}{(W.T.)^2}$$

where:

S.V.=Minimum initial surface velocity required
W.T.=Wall thickness of the tubes being welded together
K=Welding velocity coefficient 2. The method of claim 1 including using the following welding velocity coefficient (K):

1018 steel—1.6

3. The method of claim 1 including using the following welding velocity coefficient (K):

1018 steel—1.7

4. The method of claim 1 including using a welding velocity coefficient (K) of approximately 1.6–1.7 when the tubes are of 1018 steel.

5. A method of welding workpieces in the form of thin wall tubes together comprising the steps of effective relative rotation of said workpieces at speeds greater than 2,500 surface feet per minute, and forcing the workpieces into frictional engagement at their common interface until a bond is formed and the relative rotation of the workpieces is stopped.

6. The method of claim 5 wherein said step of effecting relative rotation of said workpieces is accomplished by rotating one of said workpieces relative to the other at an initial surface velocity between 2,500 and 30,000 feet per minute.

7. The method of claim 5 wherein each of said workpieces has an aperture at the interface thereof such that the wall thickness about each aperture is uniform in thickness and of a dimension not greater than 0.375 inch and wherein said step of effecting relative rotation is accomplished by relatively rotating the workpieces at a surface velocity not exceeding approximately 6,500 feet per minute when the wall thicknesses are 0.375 inch.

8. The method of claim 7 wherein said step of effecting relative rotation is accomplished by relatively rotating the workpieces at surface velocities not exceed-6,500 feet per minute when the wall thicknesses are less than 0.375 inch.

9. A method of welding together workpieces having apertures at the interface thereof such that the wall thickness about each aperture is uniform and of a dimension between 0.375 inch and 0.05 inch, comprising the steps of effecting relative rotation of said workpieces at a surface velocity within a range of predetermined maximum and minimm values extending approximately from 6,500 feet per minute to 275 feet per minute when the wall thicknesses equal 0.375 inch to 30,000 feet per minute to 1,100 feet per minute when the wall thicknesses equal 0.05 inch, and forcing the workpieces into frictional engagement at their common interface until a bond is formed and the relative rotation is stopped and wherein the minimum surface velocity throughout said range in said stop of effecting relative rotation is determined by the formula:

$$S.V. = + \frac{K^2}{(W.T.)^2}$$

where:

S.V.=Minimum initial surface velocity required
W.T.=Wall thickness
K=Welding velocity coefficient.

(References on following page)

References Cited

UNITED STATES PATENTS

| | | | |
|---|---|---|---|
| 3,458,101 | 7/1969 | Martin | 228—2 |
| 3,455,494 | 7/1969 | Stamm | 228—2 |
| 3,452,914 | 7/1969 | Obele et al. | 228—2 |
| 3,238,612 | 3/1966 | Herman | 228—2 |
| 3,235,162 | 2/1966 | Hollander | 29—470.3 |
| 3,002,871 | 10/1961 | Tramm et al. | 156—73 |

FOREIGN PATENTS 963,687  7/1964  Great Britain.

JOHN F. CAMPBELL, Primary Examiner

R. J. CRAIG, Assistant Examiner

U.S. Cl. X.R.

156—73; 228—2

PO-1050
(5/69)

UNITED STATES PATENT OFFICE
CERTIFICATE OF CORRECTION

Patent No. 3,568,299  Dated March 9, 1971

Inventor(s) Marion R. Calton; James A. Willerton, Jr.

It is certified that error appears in the above-identified patent and that said Letters Patent are hereby corrected as shown below:

Column 6: line 48, after "exceed-" at the end of the line, insert --ing predetermined values greater than approximately--; line 57, change "minimm" to read --minimum--.

Signed and sealed this 7th day of September 1971.

(SEAL)
Attest:

EDWARD M.FLETCHER,JR.
Attesting Officer

ROBERT GOTTSCHALK
Acting Commissioner of Pa